Figure 1:
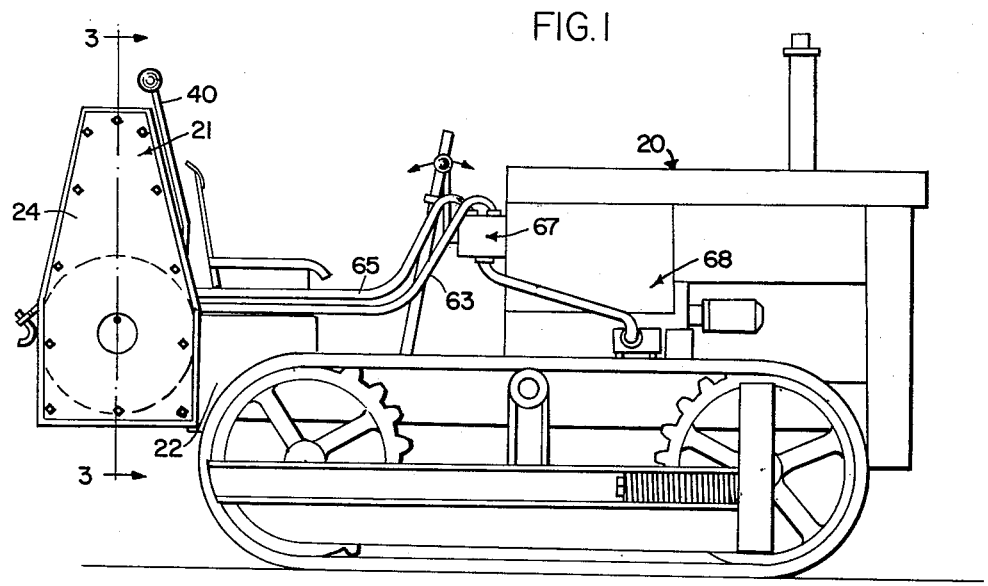

April 21, 1964      T. K. ANDERSEN      3,129,644
VALVES FOR HYDRAULIC SYSTEMS

Original Filed Nov. 5, 1958      3 Sheets-Sheet 1

INVENTOR.
THOMAS K. ANDERSEN
BY
ATTORNEY

April 21, 1964   T. K. ANDERSEN   3,129,644
VALVES FOR HYDRAULIC SYSTEMS
Original Filed Nov. 5, 1958   3 Sheets-Sheet 2
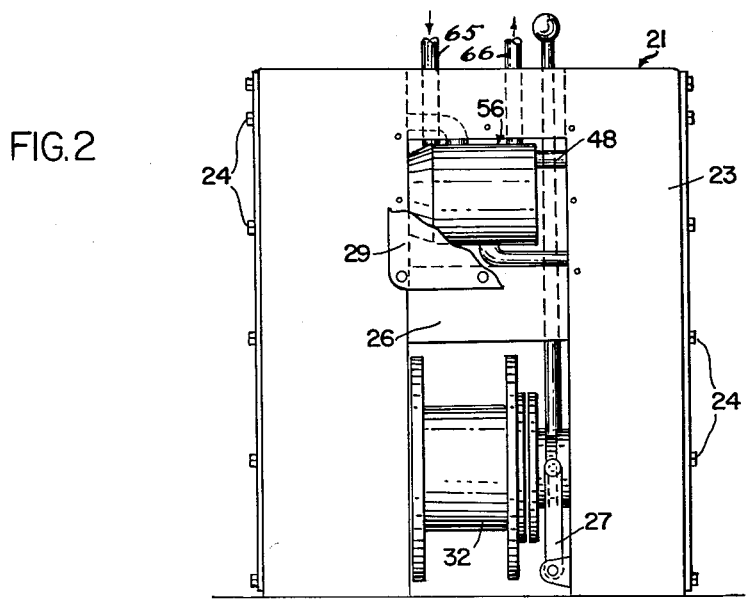
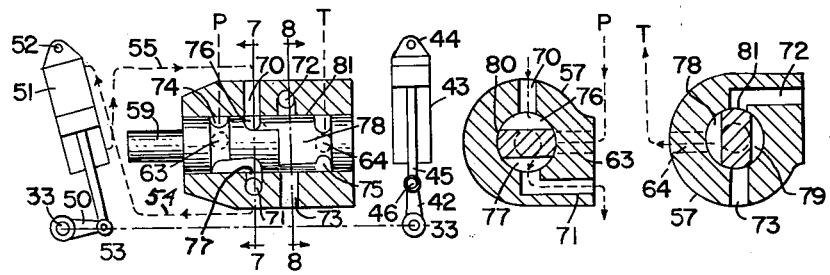
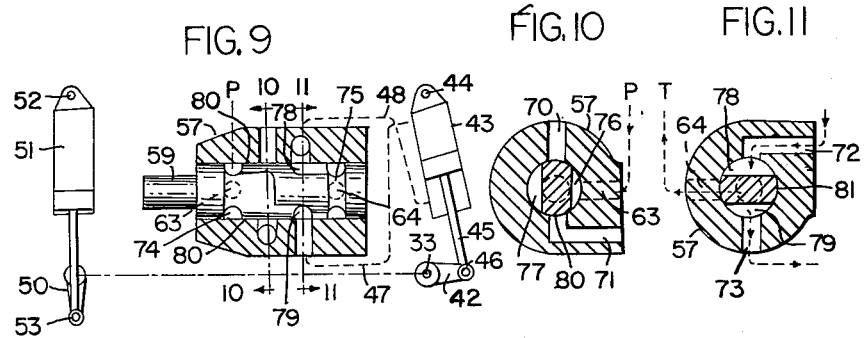
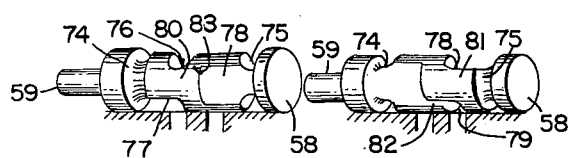
*INVENTOR.*
THOMAS K. ANDERSEN
BY
ATTORNEY April 21, 1964 T. K. ANDERSEN 3,129,644
VALVES FOR HYDRAULIC SYSTEMS
Original Filed Nov. 5, 1958 3 Sheets-Sheet 3
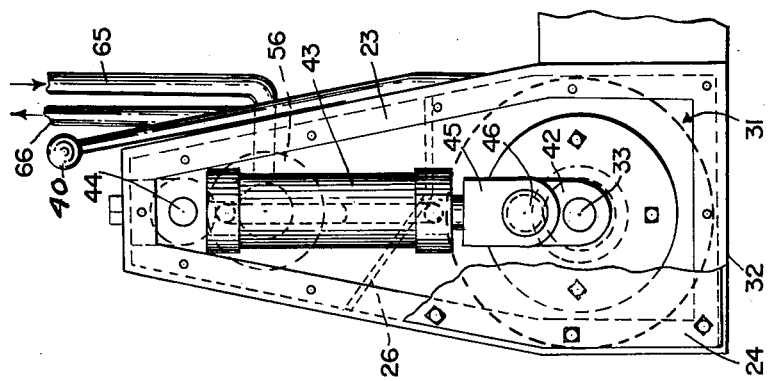
INVENTOR.
THOMAS K. ANDERSEN
BY
ATTORNEY United States Patent Office 3,129,644
Patented Apr. 21, 1964

3,129,644
VALVES FOR HYDRAULIC SYSTEMS
Thomas K. Andersen, Portland, Maine, assignor to Maine Steel Corp., South Portland, Maine, a corporation of Maine
Original application Nov. 5, 1958, Ser. No. 772,047. Divided and this application Oct. 26, 1960, Ser. No. 65,087
4 Claims. (Cl. 91—413)

The present invention relates to hydraulically operated winches and to control valves therefor and is a division of my co-pending application Serial No. 772,047, filed November 5, 1958, now abandoned.

Winches in accordance with the invention are adapted for use wherever there is available a suitable source of a liquid under pressure. For the purpose of illustrating its novel features and advantages, however, it is discussed herein primarily as an attachment for a tractor of any type having a tool operating source of oil under pressure as with an attached winch, tractor uses may be extended into many fields.

The general objectives of the present invention are to provide a winch that is adapted to function smoothly and efficiently even in the performance of heavy duties, to be capable of accurate control at all times, and to be adapted for a suitably wide range of constructions and combinations for uses other than as a tractor attachment.

These general objectives are attained by providing a winch comprising a rotatable, clutch controlled drum whose drive consists of angularly disposed cranks, piston-cylinder units operatively connected thereto, and means for circulating liquid to the units to effect their operation. The circulating means includes a valve having a rotatable element driven with the winch drum when its clutch is engaged.

The valve has a body provided with a cylindrical chamber in which the valve element is rotatable and which has pump conduits, one adjacent each end of the chamber with one being for delivery and the other being a return. In practise, the pump conduits are controlled so that their functions relative to the pump may be reversed thereby to enable the direction of rotation of the winch drum to be correspondingly changed. Between the pump conduits, there are pairs of diametrically alined ports, each pair being for an appropriate one of the cylinder-piston units and to be connected one to one cylinder end and the other to the other end thereof. Corresponding ports of the pairs of cylinder ports are arranged side-by-side.

The valve element has a plurality of pairs of transversely alined channels arranged at right angles to its axis of rotation, there being one pair for each transversely alined pair of cylinder ports and disposed to register therewith. The pairs of element channels are arranged relative to one another at an angle depending upon the angular relation of the winch cranks. The element also has annular grooves, one for each pump port and it is provided with axially extending connecting passages between each annular groove and corresponding ones of each pair of element channels.

Figure 14:
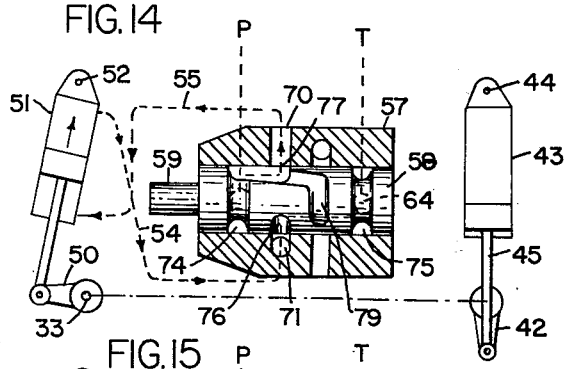
Figure 15:
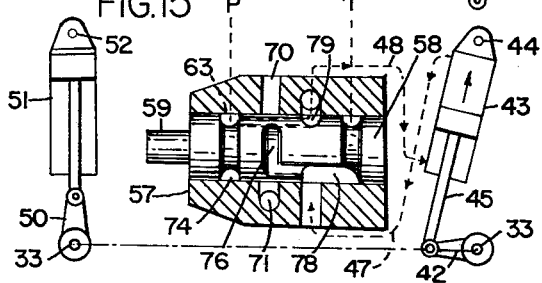
Figures 16, 17:
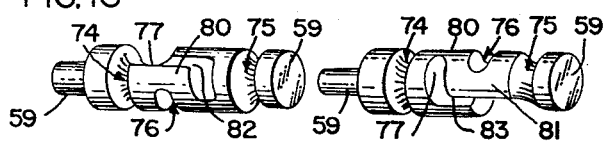

In the accompanying drawings, there is shown an illustrative embodiment of the invention, in which there are only two cranks, from which these and other of its objectives, novel features, and advantages will be readily apparent even when more than two cranks are employed. In the drawings:

FIG. 1 is a side view of a tractor on which there is mounted a winch in accordance with the invention, FIG. 2 is a view of the winch, as seen from the rear end of the tractor, on an increased scale, FIG. 3 is a section, on the scale of FIG. 2, taken approximately along the indicated lines 3—3 of FIG. 1, FIGS. 4 and 5 are, respectively, left and right end views of the winch as viewed in FIG. 3, FIG. 6 is a somewhat schematic view indicating the flow of liquid to and from the piston-cylinder units with the valve body being longitudinally sectioned and positioned as in FIG. 3, FIGS. 7 and 8 are, respectively, sections taken along the indicated lines 7—7 and 8—8 of FIG. 6, FIG. 9 is a view similar to FIG. 6 but showing the circulation of the liquid when the valve is turned 90° from its FIG. 6 position, in the direction of the arrows in FIGS. 4 and 5, FIGS. 10 and 11 are sections taken, respectively, along the indicated lines 10—10 and 11—11 of FIG. 9, FIGS. 12 and 13 are, respectively, perspective views of the valve element in its FIGS. 6 and 9 positions, FIG. 14 is a view similar to FIG. 9 but with the valve turned 90° with respect thereto in the direction of the arrows and indicating the then established liquid circulation, FIG. 15 is a view similar to FIG. 14 but with the valve again turned 90° in the direction of the arrows from its FIG. 14 position, and FIGS. 16 and 17 are, respectively, perspective views of the valve element in its FIGS. 14 and 15 positions.

In the embodiment of the invention shown in the drawings, a tractor is generally indicated at 20 and shown as having a generally indicated winch housing 21 attached to it as by mounting brackets 22 at its rear end.

The winch housing 21 has inturned end flanges 23 to which end plates 24 are detachably secured. A pair of longitudinally spaced, vertical housing walls 25, see FIG. 3, are interconnected by a horizontal partition 26 establishing a lower chamber 27 and an upper chamber 28 closed by the removable cover plate 29, see FIG. 2. The walls 25 are spaced from the ends of the winch housing 21 to provide end chambers 30 and 31.

A winch drum 32 is supported by a shaft 33 for rotation independently thereof. The shaft 33 extends through the walls 25 and through bearing units 34 into the end chambers. The bearing units are secured to the outer faces of the walls 25. At one end of the drum 32 and rotatable therewith is a first clutch element 35 engageable by the clutch element 36 slidably splined to the shaft 33 and movable with the collar 37 into and out of engagement with the clutch element 35. The collar 37 has an annular groove 38 entered by the ends of a shifting fork 39 at the lower end of a shifting lever 40 pivoted at 41 to the housing 23. The clutch elements 35 and 36 are, preferably, both of the jaw type.

Within the end chamber 31, the shaft 33 is provided with a crank 42. A cylinder 43 has its upper end pivotably connected to the housing 23 within the chamber 31 as at 44. The free end of the piston 45 is pivotably connected at 46 to the crank 42. Conduits 47 and 48 are in communication with the upper and the lower ends, respectively, of the cylinder 43.

At the end of the shaft 33 within the chamber 30, there is provided a sprocket 49 and a crank 50. The crank 50 is spaced, arcuately, 90° with respect to the crank 42. A cylinder 51 has its upper end pivotably attached as at 52 to the housing 23 with the free end of its piston pivotably connected to the crank 50 as at 53. Conduits 54 and 55 are in communication with the upper and lower ends, respectively, of the cylinder 51.

Mounted in the chamber of the housing 23 and between the walls 25 is a valve, generally indicated at 56, consisting of a body 57 bolted to the housing 23 and having a cylindrical chamber in which there is a rotatable valve element 58 provided with an exposed stem 59 extending into the end chamber 30 and there provided with a sprocket 60 identical to the sprocket 49 and connected thereto by the chain 61 so that the valve element 58 rotates in the same direction and at the same rate as the shaft 33.

The valve body 57 has ports 63 and 64 adjacent respective ones of its ends and these are connected by conduits 65 and 66, respectively, to an operator's control valve generally indicated at 67 in FIG. 1 and not detailed since it is conventional and has a neutral or closed position with respect to the tractor's pump controlled source of oil under pressure, generally indicated at 68, and two operative positions in one of which the flow of oil through the conduits 65 and 66 is reversed with respect to the circulation provided by the other.

The valve body 57 has a first pair of transversely alined ports 70 and 71 connected by the conduits 54 and 55, respectively, to the upper and lower ends of the cylinder 51 and a second pair of transversely alined ports 72 and 73 connected by conduits 47 and 48, respectively, to the upper and lower ends of the cylinder 43. The ports 70 and 72 are arranged side by side with respect to the chamber of the valve body as are the ports 71 and 73.

In accordance with the invention, the valve element 58 has annular end grooves 74 and 75 in communication with the ports 63 and 64, respectively, a first pair of intermediate transverse, alined channels 76 and 77, and a second pair of intermediate transverse, alined channels 78 and 79 axially spaced therefrom. The pairs of transverse channels 76, 77 and 78, 79 are arranged at right angles both with respect to the axis of the valve element 58 and to each other. The channels 76, 77 are disposed to register with the body ports 70, 71 as the element 58 rotates and their ends are separated from each other by arcuate portions 80. The channels 78, 79 are disposed to register with the body ports 72, 73 as the element 58 rotates and their ends are separated from each other by arcuate portions 81.

The channel 76 opens into the end groove 74 and it is connected to the channel 79 of the second pair by an axially disposed groove 82. The channel 78 opens into the end groove 75 and is also connected to the channel 76 of the first pair by an axially disposed groove 83.

In discussing the operation of the winch, it will be assumed that the operator has set the valve 67 to rotate the drum in the direction of the arrows and that the cranks are in their position illustrated by FIG. 6. In this position, the conduit 65 is the delivery line and the conduit 66 is the pump return line and with the valve element 58 disposed as in FIGS. 3 and 6, oil under pressure flows via the end groove 74 into the channel 77 and thence to the upper end of the cylinder 51 through the conduit 54. The channel 76 receives oil from the lower end of the cylinder 51 through the conduit 55 and it flows through the return port 64 via the groove 83, the channel 78 and the groove 75. Arcuate portions 81 block the pair of cylinder ports 72 and 73 while the crank 42 is in the zone of its upper dead center position.

As the valve element 58 continues to turn, the crank 50, see FIG. 9, approaches its lower dead center position during which the arcuate portions 80 block the ports 70 and 71. Before such blocking of the ports 70 and 71, the conduit 48 from the lower end of the cylinder 43 is placed in communication with the return port 64 via the channel 78, and the groove 75 with the return port 64 via the channel 78, and the groove 75 and the pump delivery port 63 is placed in communication with the conduit 47 to the upper end of the cylinder 43 via the groove 74, the channels 77 and 79, and the groove 82 which interconnects them.

When the valve element 58 has made another quarter turn, as shown in FIG. 14, its portions 81 again block the ports 72 and 73 while the crank 42 is in the zone of its lower dead center position. Oil under pressure from the port 63 is now delivered to the lower end of the cylinder 51 via the groove 74 and the channel 77 and the conduit 55. Oil from the upper end of the cylinder 51 is returned via the conduit 54 into the channel 76 and thence to the pump port 64 via the groove 82, the channel 78 and the groove 75.

On another quarter turn of the shaft, see FIG. 15, the crank 50 reaches its upper dead center position and the portions 80 again block the ports 70 and 71. Oil is now delivered to the lower end of the cylinder 43 through the conduit 48 via the groove 74, the channel 77, the groove 83, and the channel 79 while oil returns to the port 64 via the conduit 47, the channel 78 and the groove 75.

Except for the four positions described in which one or the other of the cranks is in the zone of one of its dead center positions, oil under pressure is delivered simultaneously to both piston-cylinder units ensuring maximum power, smooth performance and accurate control. When the valve 67 is placed in its other operative position, the conduit 65 becomes the oil delivery line. In such a case, the flow is reversed to reverse the direction in which the winch is driven but, otherwise, the operation is the same. When the valve 67 is placed in its neutral position, the flow of oil is blocked to lock the winch against rotation unless the clutch is disengaged.

I claim:

1. A valve for controlling the delivery of liquid under pressure to a plurality of hydraulic cylinder-piston units each of whose cylinders has first and second conduits in communication with opposite sides of its piston, said valve comprising a body having a cylindrical chamber and a valve element rotatable therein, said body having a pump delivery port adjacent one end of its chamber, a pump return port adjacent the other end thereof, and intermediate pairs of diametrically alined cylinder ports, each pair of cylinder ports being for a respective one of said units and each cylinder port of that pair being for an appropriate one of the cylinder conduits of that unit, corresponding cylinder ports of the pairs being arranged side-by-side, and said valve element having angularly spaced pairs of transversely alined channels arranged at right angles to its axis, each pair being for one of said pairs of cylinder ports and registerable therewith as said element rotates, said valve element also having annular grooves, one for each main port and in communication therewith, and connecting passages between each annular groove and a corresponding channel of each of the angularly spaced pairs thereof.

2. A valve for controlling the delivery of liquid under pressure to a plurality of hydraulic cylinder-piston units, each of whose cylinders has first and second conduits in communication with opposite sides of its piston, said valve comprising a body having a cylindrical chamber and a valve element rotatable therein, said body having a pump delivery port adjacent one end of its chamber, a pump return port adjacent the other end thereof, and two intermediate pairs of diametrically alined cylinder ports, each pair of cylinder ports being for a respective one of said units and each cylinder port of that pair being for an appropriate one of the cylinder conduits of that unit, corresponding cylinder ports of the two pairs being arranged side-by-side, and said valve element having two pairs of channels arranged at right angles to its axis and the channels of each pair being transversely alined and spaced 90° from the channels of the other pair and disposed to register with either one of the cylinder ports of an appropriate pair thereof as the valve member rotates, said valve element also having annular grooves, one for each main port and in communication therewith, and connecting passages between each annular groove and a corresponding channel of each of the two pairs thereof.

3. A valve for controlling the delivery of liquid under pressure to a plurality of hydraulic cylinder-piston units each of whose cylinders has first and second conduits in communication with opposite sides of its piston, said valve comprising a body having a cylindrical chamber and a valve element rotatable therein, said body having a pump delivery port adjacent one end of its chamber, a pump return port adjacent the other end thereof, and two intermediate pairs of diametrically alined cylinder ports, each pair of cylinder ports being for a respective one of said units and each cylinder port of that pair being for an appropriate one of the cylinder conduits of that unit, corresponding cylinder ports of the two pairs being arranged side-by-side, and said valve element having two pairs of channels arranged at right angles to its axis and the channels of each pair being transversely alined and spaced 90° from the channels of the other pair and disposed to register with either one of the cylinder ports of an appropriate pair thereof as the valve member rotates, said valve element also having annular grooves, one for each main port and in communication therewith, and connecting passages between each annular groove and a corresponding channel of each of the two pairs thereof, the element channels of each pair being spaced to provide intermediate portions for simultaneously blocking the corresponding pair of cylinder ports.

4. In combination a plurality of hydraulic cylinder-piston units each of whose cylinders has first and second conduits in communication with opposite sides of its piston, and a valve for controlling the delivery of liquid under pressure to said units, said valve comprising a body having a cylindrical chamber and a valve element rotatable therein, said body having a pump delivery port adjacent one end of its chamber, a pump return port adjacent the other end thereof, and intermediate pairs of diametrically alined cylinder ports, each pair of cylinder ports being for a respective one of said units and each cylinder port of that pair being for an appropriate one of the cylinder conduits of the unit, corresponding cylinder ports of the pairs arranged side-by-side, and said valve element having angularly spaced pairs of transversely alined channels arranged at right angles to its axis, each pair being for one of said pairs of cylinder ports and registerable therewith as said element rotates and spaced 90° from the channels of the other pair, said valve element also having annular grooves, one for each main port and in communication therewith, and connecting passages between each annular groove and a corresponding channel of each of the angularly spaced pairs thereof.

References Cited in the file of this patent

UNITED STATES PATENTS

| | | |
|---|---|---|
| 1,781,416 | Sundstrand | Nov. 11, 1930 |
| 2,077,674 | Coyle | Apr. 20, 1937 |
| 2,234,322 | Sicard | Mar. 11, 1941 |
| 2,256,144 | Gifford et al. | Sept. 16, 1941 |
| 2,349,641 | Tucker et al. | May 23, 1944 |
| 2,379,425 | Duplessis | July 3, 1945 |
| 2,391,492 | Turchan et al. | Dec. 25, 1945 |
| 2,740,383 | Hallberg et al. | Apr. 3, 1956 |
| 2,811,139 | Lado | Oct. 29, 1957 |
| 2,917,027 | Hayse | Dec. 15, 1959 |